(12) United States Patent
Hwang (10) Patent No.: US 12,073,003 B2
(45) Date of Patent: Aug. 27, 2024

(54) METHOD AND SYSTEM FOR PROVIDING TRUST COMPUTING

(71) Applicant: Piamond Corp., Busan (KR)

(72) Inventor: Doo Geon Hwang, Busan (KR)

(73) Assignee: Piamond Corp., Busan (KR)

( * ) Notice: Subject to any disclaimer, the term of this patent is extended or adjusted under 35 U.S.C. 154(b) by 0 days.

(21) Appl. No.: 18/367,179

(22) Filed: Sep. 12, 2023

(65) Prior Publication Data

US 2024/0135039 A1  Apr. 25, 2024

(30) Foreign Application Priority Data

Sep. 13, 2022  (KR) .................. 10-2022-0114947
Sep. 5, 2023  (KR) .................. 10-2023-0117699

(51) Int. Cl.
*G06F 21/62*   (2013.01)
*G06F 21/00*   (2013.01)
*G06F 21/45*   (2013.01)
*G06F 21/60*   (2013.01)

(52) U.S. Cl.
CPC ............ *G06F 21/629* (2013.01); *G06F 21/45* (2013.01); *G06F 21/604* (2013.01)

(58) Field of Classification Search
CPC ........ G06F 21/45; G06F 21/604; G06F 21/30; G06F 21/31; G06F 21/40; G06F 21/44; G06F 21/445; H04L 63/08; H04L 63/0869

See application file for complete search history.

(56) References Cited

U.S. PATENT DOCUMENTS

2020/0036519 A1* 1/2020 Bitauld ............... H04L 9/0897
2020/0050797 A1* 2/2020 Suh ..................... H04L 9/50

FOREIGN PATENT DOCUMENTS

JP        2022075546 A    5/2022

* cited by examiner

*Primary Examiner* — Edward Zee
(74) *Attorney, Agent, or Firm* — ArentFox Schiff LLP; Joseph M. Maraia; Marlo Schepper Grolnic (57) ABSTRACT

A method and system for providing trust computing are disclosed. A method for providing trust computing according to one embodiment may include at least one processor and be implemented by a computer device implementing a first node on blockchain, and may include registering smart contract for trust lambda in the first node, by the at least one processor, receiving a call of the trust lambda from business entities through a gateway, by the at least one processor, searching for a second node on the blockchain according to operation conditions of the trust lambda described in the smart contract and requesting execution of the trust lambda to the second node, by the at least one processor, receiving an execution result generated by executing the trust lambda in the second node from the second node, by the at least one processor, and providing the received execution result in response to the received call, by the at least one processor.

11 Claims, 8 Drawing Sheets

METHOD AND SYSTEM FOR PROVIDING TRUST COMPUTING

This application claims the priority benefit of Korean Patent Application No. 10-2022-0114947, filed on Sep. 13, 2022, and Korean Patent Application No. 10-2023-0117699, filed on Sep. 5, 2023 in the Korean Intellectual Property Office, the disclosure of which is incorporated herein by reference.

BACKGROUND

1. Field of the Invention

The following embodiments relate to a method and system for providing trust computing.

2. Description of Related Art

Currently, corporate IT environments are rapidly changed to multi-cloud based operating environments due to customers' anxiety for their computing resources dependent on a specific cloud service provider. However, this only reduces dependency on the operators and does not prevent the problem that the company's service operation is determined by the cloud provider, separate from ultimate trust computing.

Meanwhile, a blockchain technology is not incorporated into the mainstream of corporate IT market due to a problem from a programming interface perspective in which blockchain functions do not provide the convenience such as functions provided by current cloud service providers, a problem from a performance perspective that even in a case of L1-level blockchain, performance is insufficient to process hyperscale of corporate IT, a problem of prejudice that there are no suppliers with sufficient trust in the market among L1 and L2 blockchain providers, a problem from customer needs perspective as to whether there are market needs for trust beyond the level of existing cloud service providers, and the like.

PRIOR ART DOCUMENTS

Japanese Patent Publication No. 2022-075546

SUMMARY

A method and system for providing trust computing is provided.

A method for providing trust computing of a computer device including at least one processor and implementing a first node on blockchain may include registering smart contract for trust lambda in the first node, by the at least one processor; receiving a call of the trust lambda from business entities through a gateway, by the at least one processor; searching for a second node on the blockchain according to operation conditions of the trust lambda described in the smart contract and requesting execution of the trust lambda to the second node, by the at least one processor; receiving an execution result generated by executing the trust lambda in the second node from the second node, by the at least one processor; and providing the received execution result in response to the received call, by the at least one processor.

According to one aspect, the smart contract for trust lambda may include a code generated for a process in which mutual transactions between a plurality of business entities occur, and the second node may execute the trust lambda based on the code.

According to another aspect, the smart contract for trust lambda may include a code generated for a process for mutual trust in the business entities, and the second node may execute the trust lambda based on the code.

According to another aspect, the operation conditions may include processing performance information and cost information related to the execution of the trust lambda, and the requesting the execution may include determining the second node among nodes on the blockchain based on the processing performance information and the cost information.

According to another aspect, the method for providing trust computing may further include authenticating the received call through an authentication method defined in the smart contract, by the at least one processor, and the requesting the execution of the trust lambda may be performed in case that the received call is authenticated.

According to another aspect, the smart contact may be registered in the first node after mutual signing between the business entities related to the trust lambda, and the authenticating may authenticate the call based on the mutual signing.

According to another aspect, the business entities may pay costs for the call, and the costs may be distributed to nodes participating in the execution of the trust lambda.

According to another aspect, the providing the execution result may provide the execution result to the business entities through the gateway.

According to another aspect, the providing the execution result may provide the execution result to other business entities defined in the smart contract.

According to another aspect, the providing the execution result may provide a function for connecting services of other blockchains as the execution result.

According to another aspect, the providing the execution result may provide a function for storing and managing result values included in the execution result on the blockchain.

According to another aspect, the providing the execution result may provide a function for temporarily or permanently managing states as the execution result.

According to another aspect, the states may be stored through at least one of IPFS (InterPlanetary File System), a third node participating in computing pools of the blockchain, and a cloud service.

A computer program combined with a computer device and stored in a computer-readable recording medium to execute the method is provided.

A computer-readable recording medium recording a computer program for executing the method is provided.

A computer device implementing a first node on blockchain includes at least one processor implemented to execute readable instructions on the computer device, and by the at least one processor, smart contract for trust lambda is registered in the first node, a call of the trust lambda is received from business entities through a gateway, a second node on the blockchain according to operation conditions of the trust lambda described in the smart contract is searched and execution of the trust lambda is requested to the second node, an execution result generated by executing the trust lambda in the second node is received from the second node, and the received execution result in response to the received call is provided.

A method and system for providing trust computing may be provided.

BRIEF DESCRIPTION OF THE DRAWINGS

These and/or other aspects, features, and advantages of the disclosure will become apparent and more readily appreciated from the following description of embodiments, taken in conjunction with the accompanying drawings of which.

DETAILED DESCRIPTION

Hereinafter, embodiments are described with reference to the accompanying drawings.

A system for providing trust computing according to embodiments of the present disclosure may be implemented by at least one computer device. At this time, in the computer device implementing the system for trust computing, a computer program according to one embodiment of the present disclosure may be installed and driven, and the computer device may perform a method for providing trust computing according to embodiments of the present disclosure according to control of the driven computer program. The above described computer program may be combined with the computer device and stored in a computer-readable recording medium to execute the method for providing trust computing on the computer.

Figure 1:
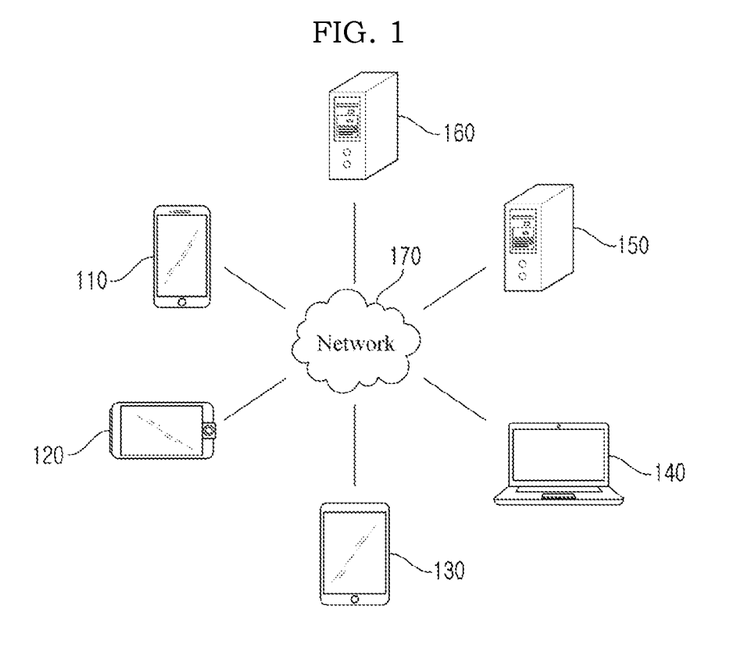
FIG. 1 is a drawing illustrating an example of a network environment according to one embodiment of the present disclosure.

FIG. 1 is a drawing illustrating an example of a network environment according to one embodiment of the present disclosure. FIG. 1 illustrates an example in which the network environment includes a plurality of electronic devices 110, 120, 130, and 140, a plurality of servers 150 and 160, and a network 170. FIG. 1 is an example for the description of invention, and the number of electronic devices or the number of servers is not limited to those illustrated in FIG. 1.

The plurality of electronic devices 110, 120, 130, and 140 may be stationary terminals or mobile terminals implemented with a computer system. As examples of the plurality of electronic devices 110, 120, 130, and 140, there are a smartphone, a mobile phone, a navigation device, a computer, a laptop computer, a terminal for digital broadcasting, personal digital assistants (PDA), a portable multimedia player (PMP), a tablet PC, a game console, a wearable device, an IoT (Internet of Things) device, a VR (virtual reality) device, an AR (Augmented reality) device, etc. As an example, in FIG. 1, a shape of a smartphone is illustrated as an example of the electronic device 110, but in embodiments of the present disclosure, the electronic device 110 may mean one of various physical computer systems capable of communicating with other electronic devices 120, 130, and 140 and/or the servers 150 and 160 through a network 170 by substantially using wireless or wired communication method.

A communication method is not limited, and may include short-distance wireless communication between devices in addition to communication methods using communication networks (e.g., a mobile communication network, wired Internet, wireless Internet, a broadcasting network, a satellite network, and the like) which may be included in the network 170. For example, the network 170 may include one or more any networks of a personal area network (PAN), a local area network (LAN), a campus area network (CAN), a metropolitan area network (MAN), a wide area network (WAN), a broadband network (BBN), and the Internet. Furthermore, the network 170 may include any one or more of network topologies, including a bus network, a star network, a ring network, a mesh network, a star-bus network, and a tree or hierarchical network, but is not limited thereto.

Each of the servers 150 and 160 may be implemented with a computer device or a plurality of computer devices for providing instructions, code, files, contents, or services by communicating with the plurality of electronic devices 110, 120, 130, and 140 through the network 170. For example, the server 150 may be a system that provides a first service to the plurality of electronic devices 110, 120, 130, and 140 connected through the network 170, and the server 160 also may be a system that provides a second service to the plurality of electronic devices 110, 120, 130, and 140 connected through the network 170. As more particular example, through an application as a computer program installed and driven in the plurality of electronic devices 110, 120, 130, and 140, the server 150 may provide a service targeted by the corresponding application (e.g., search service and the like) as the first service to the plurality of electronic devices 110, 120, 130, and 140. As another example, the server 160 may provide a service for distributing a file for installation and drive of above described application to the plurality of electronic devices 110, 120, 130, and 140 as the second service.

Figure 2:
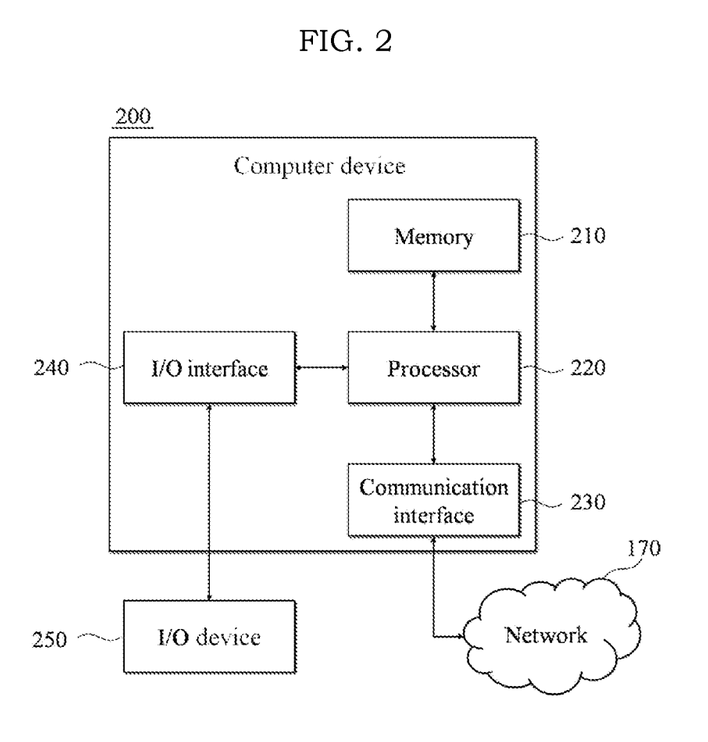
FIG. 2 is a block diagram illustrating an example of a computer device according to one embodiment of the present disclosure.

FIG. 2 is a block diagram illustrating an example of a computer device according to one embodiment of the present disclosure. Each of the plurality of electronic devices 110, 120, 130, and 140 described above or each of the servers 150 and 160 may be implemented by a computer device 200 illustrated in FIG. 2.

As illustrated in FIG. 2, such computer device 200 may include a memory 210, a processor 220, a communication interface 230, and an input/output (I/O) interface 240. The memory 210 is a computer-readable recording medium, and may include permanent mass storage devices, such as a random access memory (RAM), a read only memory (ROM) and a disk drive. Here, the permanent mass storage device, such as a ROM and a disk drive, may be included in the computer device 200 as a permanent storage device separated from the memory 210. Furthermore, an operating system and at least one program code may be stored in the memory 210. Such software components may be loaded from a computer-readable recording medium separated from the memory 210 to the memory 210. Such a separate computer-readable recording medium may include computer-readable recording media, such as a floppy drive, a disk, a tape, a DVD/CD-ROM drive, a memory card, and the like. In another embodiment, software components may be loaded onto the memory 210 through the communication interface 230, not a computer-readable recording medium. For example, the software components may be loaded onto the memory 210 of the computer device 200 based on a computer program installed by files received through the network 170.

The processor 220 may be configured to process instructions of a computer program by performing basic arithmetic, logic and I/O operations. The instructions may be provided to the processor 220 by the memory 210 or the communication interface 230. For example, the processor 220 may be configured to execute instructions received according to program code stored in a recording device, such as the memory 210.

The communication interface 230 may provide a function for enabling the computer device 200 to communicate with other devices (e.g. above described storing devices) through the network 170. For example, a request, an instruction, data or a file generated by the processor 220 of the computer device 200 according to program code stored in a recording device such as the memory 210 may be provided to other devices through the network 170 according to control of the communication interface 230. Inversely, a signal, an instruction, data or a file from another device may be received to the computer device 200 through the communication interface 230 of the computer device 200 through the network 170. A signal, an instruction or data and the like received through the communication interface 230 may be transmitted to the processor 220 or the memory 210, and a file may be stored in a storage medium (above described permanent storage device) which may be further included in the computer device 200.

The I/O interface 240 may be means for interface with an input/output (I/O) device 250. For example, the input device may include a device such as a microphone, a keyboard or a mouse and the like, and the output device may include a device such as a display or a speaker. For another example, the I/O interface 240 may be means for interface with a device in which functions for input and output have been integrated into one, such as a touch screen. The I/O devices 250, together with the computer device 200, may be configured as a single device.

Furthermore, in other embodiments, the computer device 200 may include components less or more than the components of FIG. 2. However, it is not necessary to clearly illustrate most of conventional components. For example, the computer device 200 may be implemented to include at least some of the I/O device 250 or may further include other components such as a transceiver and a database.

In case of a function for serverless computing provided by cloud providers (e.g., Lambda of AWS (Amazon Web Service), "Functions" of Microsoft Azure, "Cloud Function" of Google), it is oriented toward serverless in terms of usage environment, but the corresponding function has a limitation depending on CSP (Cloud Service Provider). Such function for serverless computing supplies computing resources through data centers based on large investments by cloud providers, and the service is operated in a specific region. The service can be used in on-demand or reserved form, but there is a big difference in terms of costs.

Meanwhile, Trusted Lambda Computing based on blockchain may avoid dependency on specific operators or nodes by using computer power of decentralized nodes of blockchain. Such Trusted Lambda Computing allows computing resources to be configured and serviced by a set of decentralized nodes. At this time, if an individual or company can supply unused computing resources, they can supply the corresponding resources and receive compensation for the cost of supply.

Figure 3:
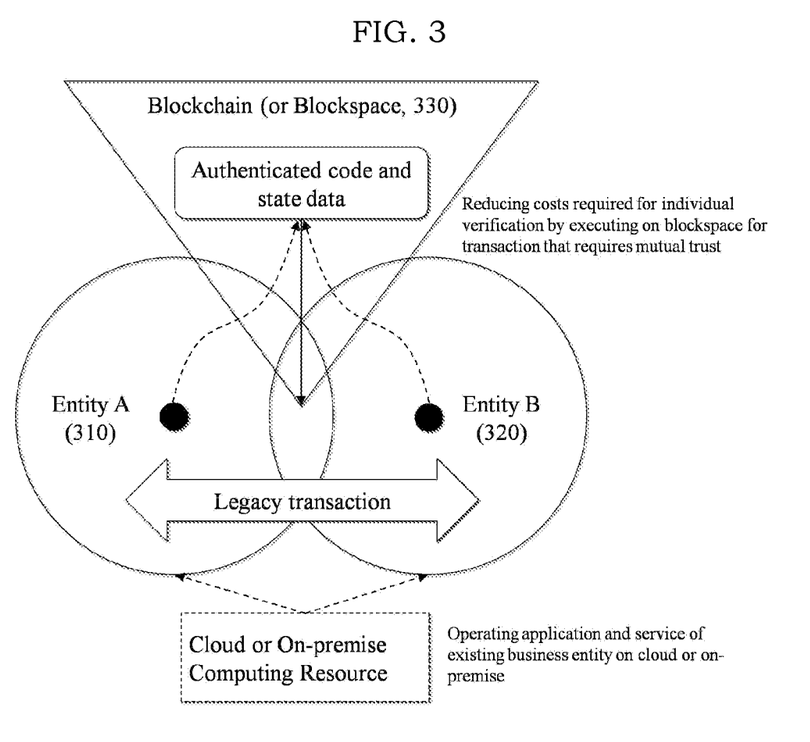
FIG. 3 is a drawing illustrating an example of use of trust lambda between business entities according to one embodiment of the present disclosure.

FIG. 3 is a drawing illustrating an example of use of trust lambda between business entities according to one embodiment of the present disclosure. If a code-based transaction between two different domains or Entity A 310 and Entity B 320 is required, mutual verification procedures may be simplified based on trust of trust computing. For example, when each of individual Entities 310, 320 verifies its own transaction, costs in the form of $2n$ are incurred, but when processing this in an environment where all Entities 310, 320 can trust, costs may be reduced. Various types of transactions such as events that require business and settlement between existing companies bear additional costs due to mutual trust issues. However, transactions of this nature are processed by using trust lambda on blockchain (or blockspace) 330, opportunity costs for trust can be dramatically reduced.

Figure 4:
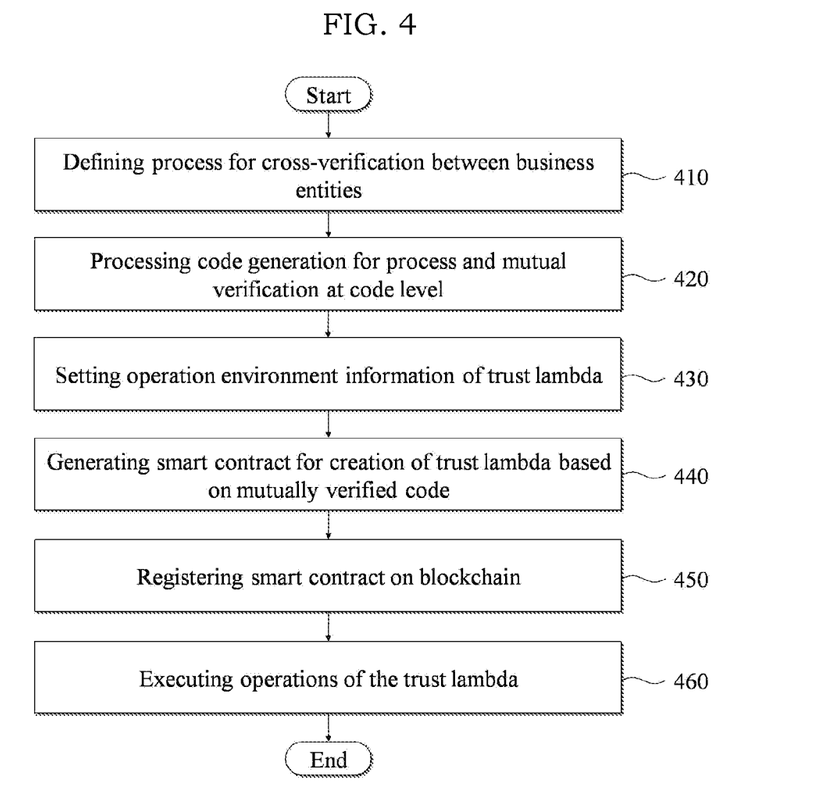
FIG. 4 is a flow chart illustrating an example of creation process of trust lambda according to one embodiment of the present disclosure.

FIG. 4 is a flow chart illustrating an example of creation process of trust lambda according to one embodiment of the present disclosure. At least part of creation process of trust lambda according to one embodiment of the present disclosure may be included in a method for providing trust computing, and may be performed by the computer device 200 implementing a system for providing trust computing. At this time, the processor 220 of the computer device 200 may be implemented to execute control instructions according to a code of operating system included in the memory 210 or a code of at least one computer program. Here, the processor 220 may control the computer device 200 for the computer device 200 to perform Steps 410 to 460 included in the method of FIG. 4 according to the control instructions provided by the code stored in the computer device 200.

In Step 410, the computer device 200 may define a process for cross-verification between business entities. For example, the computer device 200 may define the process for cross-verification by selecting a process in which mutual transaction between business entities occur and storing it as the process for cross-verification in the system for providing trust computing. At this time, the process may be various forms such as business or financial, data and the like, and it may mean an object that may be called by using a programmable interface in the form of an API (Application Program Interface). The embodiment of FIG. 4 describes defining the process for cross-verification between business entities so that the function of trust lambda can be called through calls between two or more different business entities, but depending on the embodiment, a process for mutual trust may be defined and used in the business entity in order to call the function of trust lambda for mutual trust in a single business entity.

In Step 420, the computer device 200 may process code generation for the process and mutual verification at the code level. For example, the computer device 200 may generate a code for processing the process based on interface and definition for the process. At this time, a mutually verifiable code environment must be adopted, and for this, the computer device 200 may process mutual verification at the code level through communication with a system of individual business entity so that the code-level mutual verification for the corresponding process proceeds through the individual business entity.

In Step 430, the computer device 200 may set operation environment information of the trust lambda. For example, the computer device 200 may determine processing performance information such as priority, available memory, and network response speed, and cost-related information as operation environment information for operation conditions of the trust lambda, and then, may mutually confirm this through individual business entity. Thereafter, the computer device 200 may store the corresponding operation environment information separately.

In Step 440, the computer device 200 may generate smart contract for creation of the trust lambda based on mutually verified code. For example, the computer device 200 may generate smart contract for registering a code for the trust lambda based on the verified code and the set operation environment information. The generated smart contract may be handled by one of each business entity, and may contain the mutually crossed code.

In Step 450, the computer device 200 may register the smart contract on blockchain. The trust lambda may be called from at least one or more business entities. Therefore, the computer device 200 may register the smart contract on blockchain after mutual signing between business entities. At this time, for each business entity, authentication through signature may be required when calling the smart contract.

In Step 460, the computer device 200 may execute operations of the trust lambda. The completed trust lambda may operate on nodes for providing trust computing based on the operation conditions. In this embodiment, it is supposed that the computer device 200 includes nodes on blockchain that executes the operations of the trust lambda, but depending on the embodiment, the operations of the trust lambda may be executed by a node implemented on a physical device which is different from the computer device 200.

Figure 5:
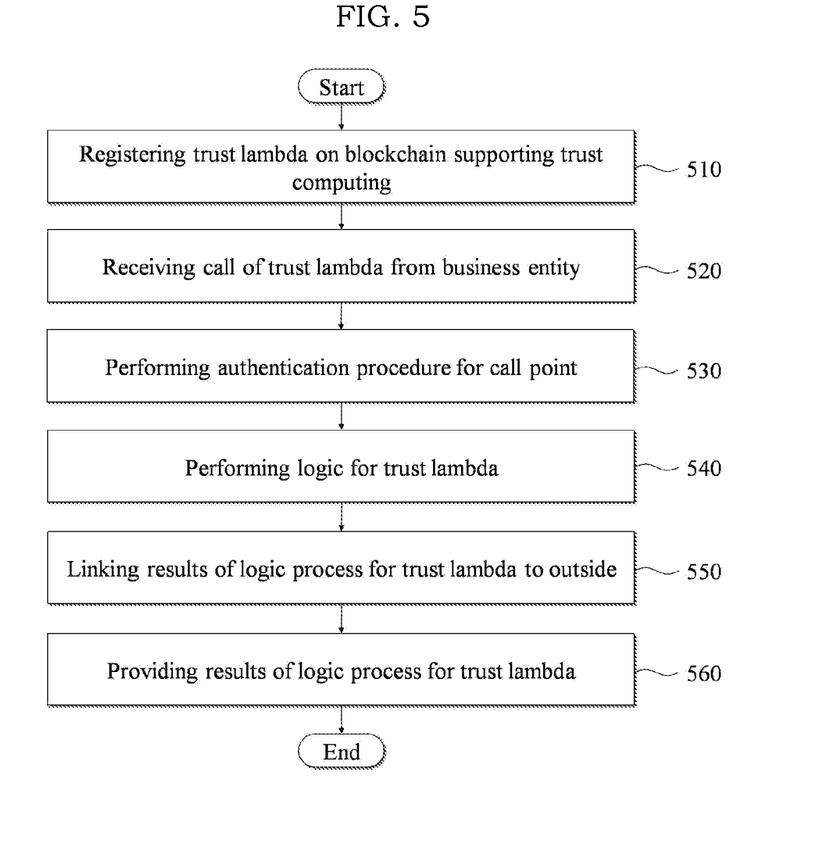
FIG. 5 is a flow chart illustrating an example of registration and operation process of trust lambda according to one embodiment of the present disclosure.

FIG. 5 is a flow chart illustrating an example of registration and operation process of trust lambda according to one embodiment of the present disclosure. At least part of registration and operation process of trust lambda according to the this embodiment may be included in the method for providing trust computing, and may be performed by the computer device 200 implementing the system for providing trust computing. At this time, the processor 220 of the computer device 200 may be implemented to execute control instructions according to a code of operating system included in the memory 210 or a code of at least one computer program. Here, the processor 220 may control the computer device 200 to perform Steps 510 to 560 included in the method of FIG. 5 according to the control instructions provided by the code stored in the computer device 200.

In Step 510, the computer device 200 may register the trust lambda on blockchain supporting the trust computing. Such Step 510 may correspond to Step 450 described above through FIG. 4 or may be included in Step 450. For example, the computer device 200 may transmit (broadcasting) information for smart contract to individual node in order to register the trust lambda on blockchain network supporting trust computing.

The subsequent Steps 520 to 560 may be performed by the computer device 200 implementing a node of blockchain network processing logic of the trust lambda. At this time, the computer device 200 implementing such node may be the same with the computer device 200 registering the trust lambda, but they may be different from each other.

In Step 520, the computer device 200 may receive a call of the trust lambda from the business entity. For API call, the business entity may pay costs required by blockchain providing the trust computing. The corresponding costs may be distributed to nodes participating in the trust computing.

In Step 530, the computer device 200 may perform authentication procedure for call point. The business entity may perform authentication for corresponding call when calling the trust lambda. The individual business entity may load authentication information for its own call on the smart contact in advance. For example, mutual signing between business entities was described above. The authentication information may include information for such mutual signing. At this time, the computer device 200 may provide a control function when REST (Representational State Transfer) API responds to cross domain resource request by using CORS (Cross-Origin Resource Sharing). Also, the computer device 200 may confirm whether the request called by the business entity originates from a pre-designated API gate by using client SSL (Secure Sockets Layer) certificate.

In Step 540, the computer device 200 may perform logic for the trust lambda. For example, the computer device 200 may perform logic of the trust lambda for authenticated call in Step 530. Performing logic may be performed on nodes of blockchain for providing trust computing. In this embodiment, it is supposed that the corresponding nodes are implemented in the computer device 200, but the nodes performing logic may be implemented through a computer device different from the computer device 200.

In Step 550, the computer device 200 may link results of logic process for trust lambda to the outside. For example, the computer device 200 may perform processing tasks such as recall or information storage through an external link interface for process results of logic for trust lambda. At this time, in case of external information that may be called, in case of trust lambda in which multiple business entities participate, only pre-designated information may be used as a linkage target.

In Step 560, the computer device 200 may provide results of logic process for trust lambda. At this time, the computer device 200 may transmit results from multiple business entities specified in smart contract in addition to the business entity that called the trust lambda according to setting.

The below Table 1 and Table 2 represent an example of metadata of smart contract, respectively.

TABLE 1

■ "Trust Lambda Metadata Schema Version" : "string", // version information (e.g., "TLMS-01")
■ "Language" : "string", // language of source code (e.g., Solidity, etc)
■ "Compiler" // complier related information
    ■ "Vesion" : "string",
    ■ "Name" : "string"
■ "Sources: // location information of TrustLambda code
    ■ "FileName": "string",
    ■ "FileUrls" : "string",
    ■ "HashValue" : "string"}],
■ "Signee list" : // list of signees
    ■ "Signee UID" : "string",
    ■ "name" : "string",
    ■ "Contract" : "string"
■ "Signee Key list" : // key information and method list of signees
    ■ "Signee UID" : "string",
    ■ "keyId" : "string",
    ■ "SigningAlgorithm" : "string"
■ "Trust Lambda Caller Info list" : // information to call Trust Lambda (when calling only from a specific address)
    ■ "Signee UID" : "string",
    ■ "RequestURL" : "string"
■ "Trust Lambda Response Info list" : // information to transmit response after processing Trust Lambda (response logic is determined from execution logic of Trust Lambda)
    ■ "Signee UID" : "string", TABLE 1-continued

- ▪ "ResponseMethod" : "string" // types of supportable response method (restful, api call, etc)
- ▪ "ResponseURL" : "string" // when there is a specific response target URL
- ▪ "Setting" : // Smart Contract related setting information
  - ▪ "Priority" : "string" // Priority Class information : realtime, high, aboveNormal, normal, belowNormal, Idle(low)
  - ▪ "CostAllocation" : "string" // cost processing method for Trust Lambda execution (method such as Caller, Share, and the like)

```
[
{
"Trust Lambda Metadata Schema Version" : "string", // version
information (e.g., "TLMS-01")
"Language" : "string", // language of source code (e.g., Solidity, etc)
"Compiler" : [ { "Vesion" : "string", "Name" : "string"} ], // complier
related information
"Sources: [ { "FileName": "string", "FileUrls" : "string",
"Hash Value" : "string"}], // location of TrustLambda code
"Signee list" : [ { "Signee UID" : "string", "name" : "string",
"Contract" : "string"}] // list of signees
"Signee Key list" : [ { "Signee UID" : "string", "keyId" : "string",
"SigningAlgorithm" : "string"} ] // key information and
method list of signees
"Trust Lambda Caller Info list" : [ { "Signee UID" : "string",
"RequestURL" : "string"} ] // information to call Trust Lambda (when
calling only from a specific address)
"Trust Lambda Response Info list" : : [ { "Signee UID" : "string",
"ResponseURL" : "string"}] // information to transmit
response after processing Trust
Lambda (response logic is determined from execution
logic of Trust Lambda
"Setting" : [ { "Optimizer : {
}
]
```

Figure 6:
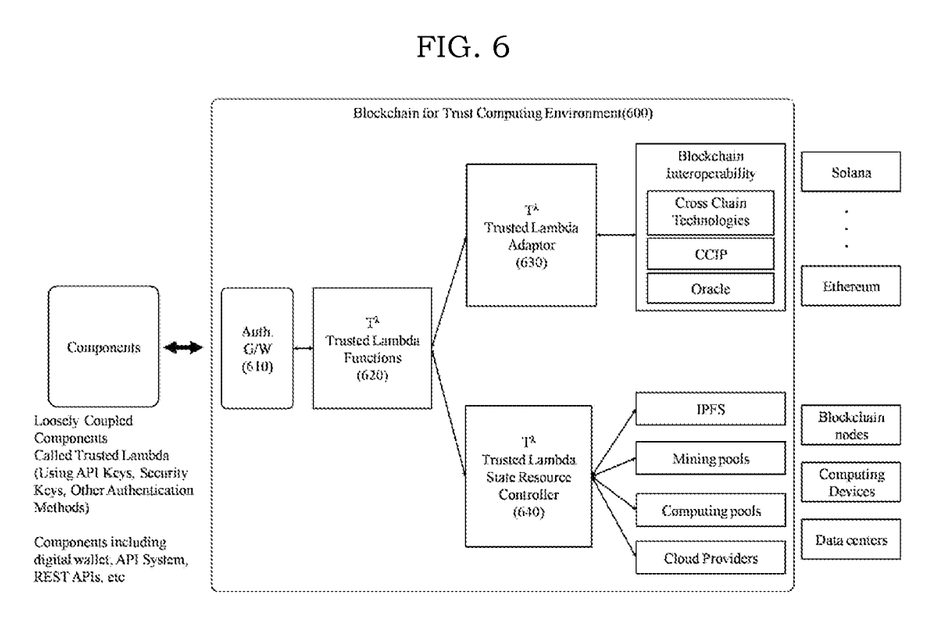
FIG. 6 is a drawing for describing an example of configuration of trust lambda according to one embodiment of the present disclosure.

FIG. 6 is a drawing for describing an example of configuration of trust lambda according to one embodiment of the present disclosure. Blockchain for trust computing environment 600 may include Auth. G/W (Authentication Gateway) 610, Trusted Lambda Functions 620, Trusted Lambda Adaptor 630, and Trusted Lambda State Resources Controller 640.

The Auth. G/W 610 may be loosely coupled to a component calling trust lambda such as a digital wallet, API system, REST APIs, and the like. At this time, the component calling trust lambda may call trust lambda by using API key, security key, and other authentication methods. The Auth. G/W 610 may call the Trusted Lambda Functions 620 to execute the called trust lambda (execute logic for trust lambda).

The Trusted Lambda Functions 620 is a kind of calculation service executed in a node participating in trust computing resources among nodes of the Blockchain 600, and may mean a code execution environment that does not require provisioning or management for a separate application. The corresponding application may be deployed based on smart contract, and must be able to be executed according to conditions defined in the smart contract when called externally. The node executing the Trusted Lambda Functions 620 may be implemented so that no separate restrictions may be placed on the execution of trust lambda.

The Trusted Lambda Adaptor 630 may provide a function for connecting services of other blockchains (e.g., Solana, Ethereum, and the like) as results of execution of trust lambda. In case that the trust lambda is operated with condition of mutual trust, the Trusted Lambda Adaptor 630 may provide a function for directly storing and managing result values according to execution of trust lambda on another blockchain. For this, the Trusted Lambda Adaptor 630 may use technologies for interoperability between blockchains. For example, the Trusted Lambda Adaptor 630 may connect third-party blockchain main network and the like by using CCT (Cross Chain Technologies), CCIP (Cross-Chain Interoperability Protocol), Oracle, etc.

When state needs to be temporarily or permanently managed as results of execution of trust lambda, the Trusted Lambda State Resources Controller 640 may provide a function for using a separate storage space. For this, the Trusted Lambda State Resources Controller 640 may use IPFS (InterPlanetary File System) in decentralized way, or utilize a node participating a separate computing pool, or utilize a cloud service, and the like.

Figure 7:
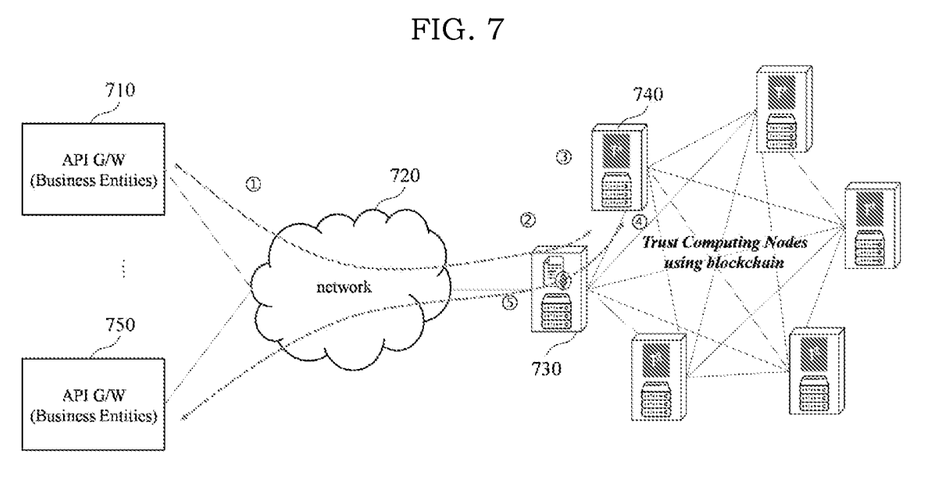
FIG. 7 is a drawing for illustrating an example of configuration of trust lambda computing network according to one embodiment of the present disclosure.

FIG. 7 is a drawing for illustrating an example of configuration of trust lambda computing network according to one embodiment of the present disclosure. Trust lambda is located on blockchain node that provides trust computing, and when an API call is made from the outside, it is performed on the most responsive (fast and low-cost) node based on information on smart contract. An operating environment is determined based on location information on network of API call and cost policy information set by each trust computing node, and when multiple calls are made consecutively, corresponding requests may be distributed and executed between nodes based on response performance.

① API G/W (API Gateway) 710 may call trust lambda registered in the form of smart contract through a network 720 for utilization of trust lambda.

② A first node 730 having smart contract of trust lambda may confirm whether call is safe through an authentication method defined in smart contract.

③ A second node 740 which is the most suitable for operation conditions of trust lambda described in the smart contract may be searched, and then, a function for trust lambda may be performed in the second node 740.

④ The second node 740 may generate a response based on a previously defined processing type for processing results according to execution of trust lambda and transmit it to the first node.

⑤ The first node 730 may transmit the response transmitted from the second node 740 to the API G/W 750 defined in the smart contract. The Gateway that will transmit the response (API G/W 750) may be the same or different from the Gateway calling trust lambda (API G/W 710).

Figure 8:
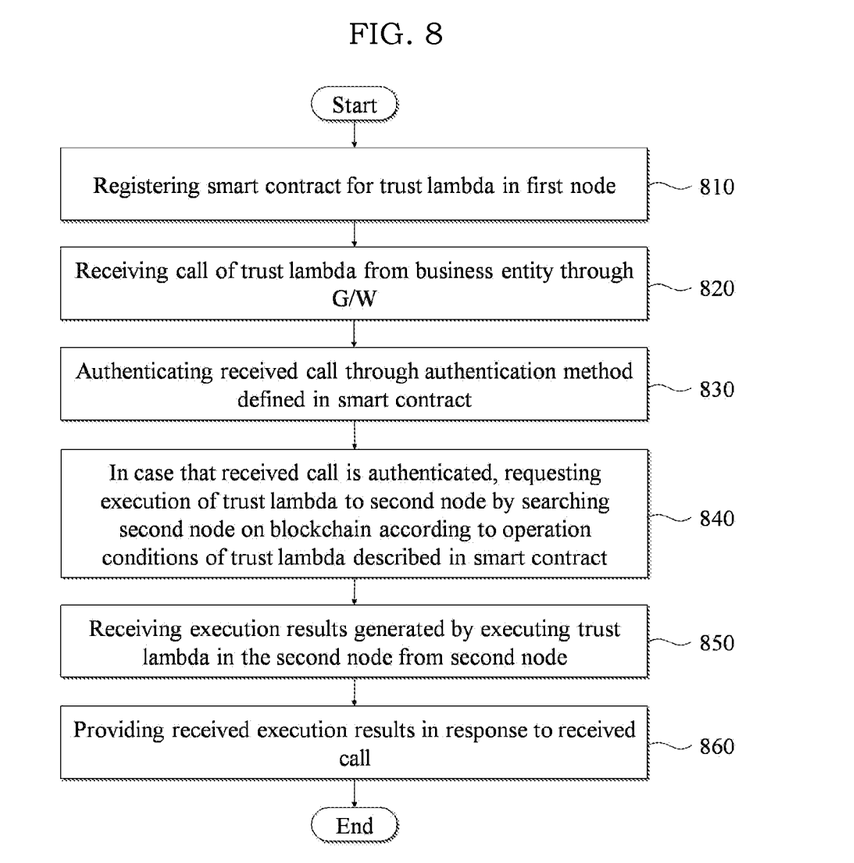
FIG. 8 is a flow chart illustrating an example of a method for providing trust computing according to one embodiment of the present disclosure.

FIG. 8 is a flow chart illustrating an example of a method for providing trust computing according to one embodiment of the present disclosure. A method for providing trust computing according to one embodiment may be performed by the computer device 200 implementing a node of blockchain that has registered smart contract of trust lambda. At this time, the processor 220 of the computer device 200 may be implemented to execute control instructions according to a code of an operating system included in the memory 210 or a code of at least one computer program. Here, the processor 220 may control the computer device 200 to perform Steps 810 to 860 included in the method of FIG. 5 according to control instructions provided by a code stored in the computer device 200.

In Step 810, the computer device 200 may register smart contract for trust lambda in a first node. Here, the first node may be a node on the blockchain implemented by the computer device 200. At this time, the smart contract for trust lambda may include a code generated for a process in which mutual transactions occur between a plurality of business entities and operation conditions of trust lambda. Also, according to the embodiment, the smart contract for trust lambda may include a code generated for a process for mutual trust in the business entities. Here, the operation conditions may include processing performance information and cost information related to execution of trust lambda.

In Step 820, the computer device 200 may receive a call of trust lambda from a first business entity through G/W (Gateway). Here, the G/W may include API G/W processing API call.

In Step 830, the computer device 200 may authenticate the received call through an authentication method defined in the smart contract. For example, the smart contract may be registered in the first node after mutual signing between a plurality of business entities related to the trust lambda. In this case, the computer device 200 may authenticate the call based on the mutual signing in Step 830.

In Step 840, in case that the received call is authenticated, the computer device 200 may request execution of trust lambda to the second node by searching the second node on the blockchain according to the operation conditions of trust lambda described in the smart contract. For example, the computer device 200 may determine the second node among the nodes on the blockchain based on processing performance information and cost information included in the operation conditions.

In Step 850, the computer device 200 may receive execution results generated by executing the trust lambda in the second node from the second node. For example, the computer device 200 may transmit a request including a code included in the smart contract (a code generated for a process in which mutual transactions occur between a plurality of business entities or a code generated for a process for mutual trust in business entities) to the second node, and the second node may process execution of trust lambda based on the code included in the request. After this, the computer device 200 may receive execution results from the second node.

In Step 860, the computer device 200 may provide the received execution results in response to the received call. For example, the computer device 200 may provide the execution results through the G/W to a first business entity. As another example, the computer device 200 may provide the execution results to a second business entity defined in the smart contract. As another example, the computer device 200 may provide a function for connecting services of other blockchains as the execution results. The function for connecting services of other blockchains such as Solana, Ethereum, and the like was described above. As another example, the computer device 200 may provide a function for storing and managing result values included in the execution results on blockchain. As another example, the computer device 200 may provide a function for temporarily or permanently managing states as the execution results. At this time, the states may be stored through at least one of IPFS, a third node participating a computer pool, and a cloud service.

Meanwhile, business entities may pay costs for call. In this case, the corresponding costs may be distributed to nodes participating execution of trust lambda.

Likewise, according to embodiments of the present disclosure, the method and system for providing trust computing may be provided.

The system and device described herein may be implemented using hardware components, software components, and/or a combination thereof. For example, the device and components described in the example embodiments may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and/or data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The method according to the example embodiments may be implemented in the form of a program instruction executable by various computer means and stored in a computer-readable storage medium. The media may also include, alone or in combination with the program instructions, data files, data structures, and the like. The medium may continue to store a program executable by a computer or may temporarily store the program for execution or download. Furthermore, the medium may be various recording means or storage means of a form in which one or a plurality of pieces of hardware has been combined. The medium is not limited to a medium directly connected to a computer system, but may be one distributed over a network. Examples of the medium may be magnetic media such as a hard disk, a floppy disk and a magnetic tape, optical media such as a CD-ROM and a DVD, magneto-optical media such as a floptical disk, and media configured to store program instructions, including, a ROM, a RAM, and a flash memory. Furthermore, other examples of the medium may include an app store in which apps are distributed, a site in which various pieces of other software are supplied or distributed, and recording media and/or storage media managed in a server. Examples of program instructions include both machine code, such as produced by a compiler, and higher level code that may be executed by the computer using an interpreter.

As described above, although the embodiments have been described in connection with the limited embodiments and the drawings, those skilled in the art may modify and change the embodiments in various ways from the description. For example, proper results may be achieved although the aforementioned descriptions are performed in order different from that of the described method and/or the aforementioned elements, such as the system, configuration, device, and circuit, are coupled or combined in a form different from that of the described method or replaced or substituted with other elements or equivalents.

Accordingly, other implementations, other embodiments, and the equivalents of the claims fall within the scope of the claims.

The invention claimed is:

1. A method for providing trust computing of a computer device including at least one processor and implementing a first node on blockchain, comprising:
registering smart contract for trust lambda in the first node, by the at least one processor;
receiving a call of the trust lambda from business entities through a gateway, by the at least one processor;
searching for a second node on the blockchain according to operation conditions of the trust lambda described in the smart contract and requesting execution of the trust lambda to the second node, by the at least one processor;
receiving an execution result generated by executing the trust lambda in the second node from the second node, by the at least one processor;
providing the received execution result in response to the received call, by the at least one processor; and
authenticating the received call through an authentication method defined in the smart contract, by the at least one processor;
wherein the requesting the execution of the trust lambda is performed in case that the received call is authenticated; and
wherein the smart contract is registered in the first node after mutual signing between the business entities related to the trust lambda, and the authenticating authenticates the call based on the mutual signing.

2. The method for providing trust computing of claim 1, wherein the smart contract for trust lambda comprises a code generated for a process in which mutual transactions between a plurality of business entities occur, and the second node executes the trust lambda based on the code.

3. The method for providing trust computing of claim 1, wherein the smart contract for trust lambda comprises a code generated for a process for mutual trust within the business entities, and the second node executes the trust lambda based on the code.

4. The method for providing trust computing of claim 1, wherein the operation conditions comprise processing performance information and cost information related to the execution of the trust lambda, and the requesting the execution comprises determining the second node among nodes on the blockchain based on the processing performance information and the cost information.

5. The method for providing trust computing of claim 1, wherein the business entities pay costs for the call, and the costs are distributed to nodes participating in the execution of the trust lambda.

6. The method for providing trust computing of claim 1, wherein the providing the execution result provides the execution result to the business entities through the gateway.

7. The method for providing trust computing of claim 6, wherein the providing the execution result further provides the execution result to other business entities defined in the smart contract.

8. The method for providing trust computing of claim 1, wherein the providing the execution result provides a function for connecting services of other blockchains as the execution result.

9. The method for providing trust computing of claim 1, wherein the providing the execution result provides a function for storing and managing result values included in the execution result on the blockchain.

10. The method for providing trust computing of claim 1, wherein the providing the execution result provides a function for temporarily or permanently managing states as the execution result.

11. The method for providing trust computing of claim 10, wherein the states are stored through at least one of IPFS (InterPlanetary File System), a third node participating in computing pools of the blockchain, and a cloud service.

* * * * *